3,035,310
METHOD OF MAKING REINFORCED SYNTHETIC RESIN FORMING TOOL
Benjamin Sokol, Valley Stream, and Lawrence R. Sparrow, Flushing, N.Y., assignors to Republic Aviation Corporation, near Farmingdale, Suffolk County, N.Y., a corporation of Delaware
Filed Jan. 23, 1956, Ser. No. 560,569
4 Claims. (Cl. 18—59)

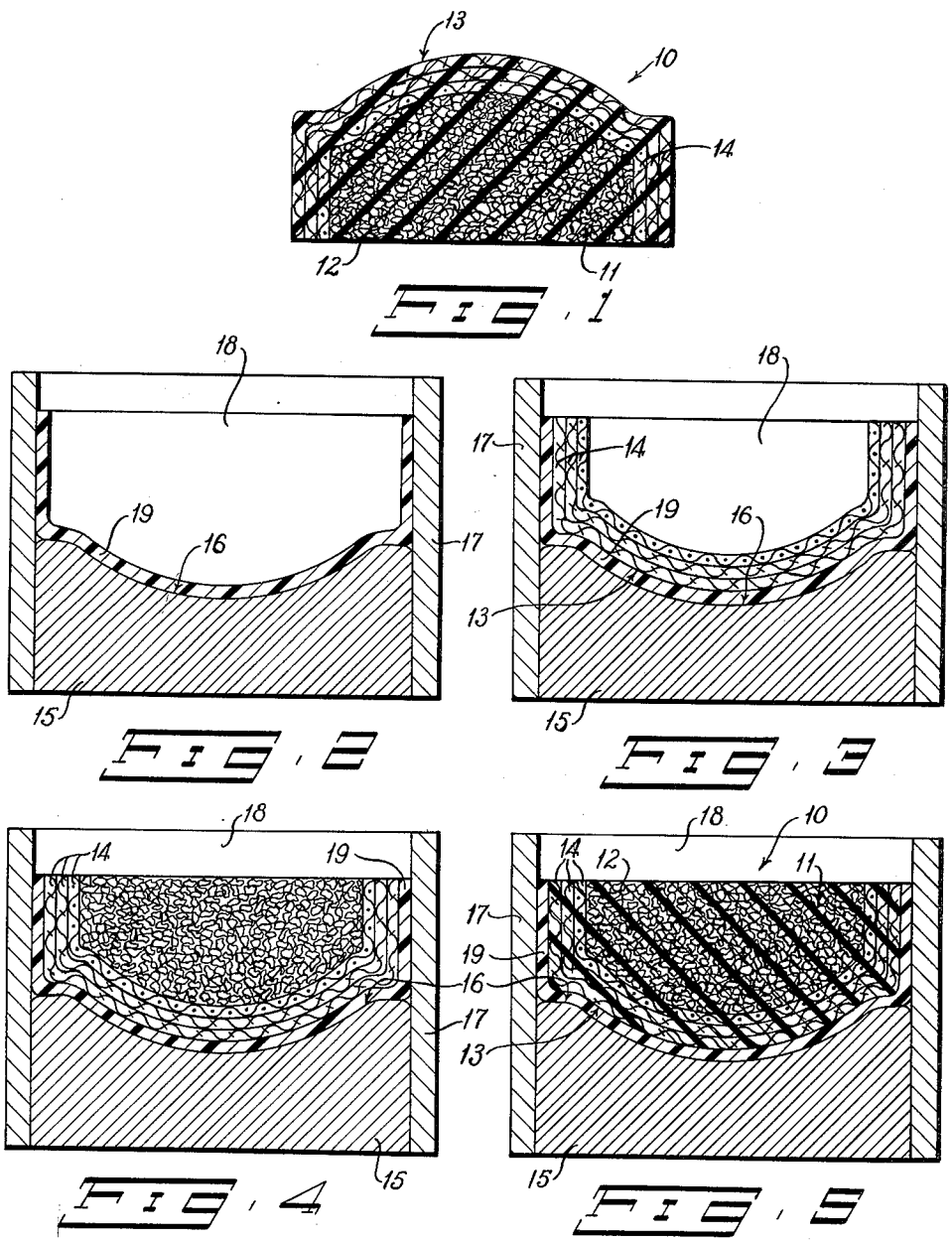
INVENTORS.
Benjamin Sokol and
BY Lawrence R. Sparrow
ATTORNEY.

This invention relates generally to forming tools and more particularly has to do with forming tools fabricated from a reinforced synthetic resin composition and the method of making the same.

Among other objects, the present invention contemplates a forming tool consisting of a body of synthetic resin composition, reinforced by coarse particles and having a surface reinforcement of one or more layers of fabric.

With the above and other objects in view, as will become apparent, the present invention consists in the method, combination and arrangement of materials and parts all as hereinafter more fully described, claimed and illustrated in the accompanying drawing wherein:

FIG. 1 is a section through a forming tool made in accordance with the present invention;

FIG. 2 illustrates the early steps in the method of fabricating the tool, and is a vertical section through a master pattern surrounded by a flask and having a parting agent applied as a coating to the contoured surface of the pattern on which the working face of the tool is to be formed and the inner surface of the flask;

FIG. 3 illustrates a step subsequent to FIG. 2 and is a section similar to FIG. 2 showing a plurality of reinforcing layers of fabric or equivalent material positioned on the coated contoured surface of the master pattern and the inner surface of the flask;

FIG. 4 illustrates a step in the instant method subsequent to those shown in FIGS. 2 and 3, and is a section showing coarse particles disposed within the flask and on the reinforcing layers of fabric; and FIG. 5 illustrates the final step in the present method and is a section similar to FIG. 4 but after the synthetic resin composition forming the body of the tool has been poured into the flask to surround and embed the coarse particles and to impregnate and permeate the reinforcing layers of fabric or equivalent material.

Heretofore, forming tools used in conjunction with drop-hammers, hydro-presses, stretch-presses, etc. have been fabricated from relatively expensive materials such as steel, lead, kirksite, (an alloy of about 92% zinc, 3% copper and 5% aluminum) and other similar materials. Moreover, the methods heretofore practiced in making such forming tools have usually required that the tool be accurately and carefully ground, machined or hand-finished to conform it to a master pattern. It is manifest, therefore, that these practices not only require the use of relatively expensive materials but, in addition thereto, a considerable amount of time must be spent in finishing the forming tool.

The proposed forming tool and the method of making the same, however, eliminates the customary time-consuming hand-finishing operations heretofore needed in the fabrication of forming tools and, in addition, permits the use of relatively inexpensive materials.

In general, the present invention contemplates a forming tool made from synthetic resin composition, reinforced by coarse particles such as crushed stone, gravel, pebbles or metallic shot and similar materials and having a working face or surface reinforced by one or more layers of fabric or equivalent materials.

Moreover, the present method of making forming tools of this type provides for fabricating the tool directly on a master pattern, and hence no finishing operations of any kind are required for the tool.

Referring now to the drawing (FIG. 1), 10 designates a forming tool as contemplated herein, comprising a body 11 made from a synthetic resin composition, hereinafter described in detail, reinforced by coarse particles 12 such as crushed stone, gravel, pebbles, metallic shot or the like. The body 11 of the tool in the area adjoining its working face or surface 13 is reinforced by one or more layers of fabric 14. The reinforcing fabric 14 may be of any material having a relatively uniform dispersion of interstices, e.g. glass cloth, fiberglass mat, wire mesh or similar material. These reinforcing fabrics may be woven or matted and can be used singly or in any combination such as shown in FIG. 1 wherein both glass cloth and wire mesh are used as the reinforcing fabric layers 14.

In addition to reinforcing the working surface 13 and the adjacent area of the body 11, the fabric layer or layers 14 insure a smooth working surface for the tool by isolating the coarse particles 12 from the working surface 13 thereby preventing irregularities from developing in the working surface 13.

Referring now to FIGS. 2 to 5 inclusive wherein the principal steps of the method of fabricating the forming tool 10 are illustrated, 15 designates a master pattern constructed in accordance with conventional practice. Thus, the master pattern 15 may be made of plaster or any other suitable material commonly used in the fabrication of such patterns and is provided with a contoured surface 16 that is to be exactly reproduced in the forming tool 10 to establish the working face 13 thereof.

As shown in FIG. 2, the master pattern 15 is positioned within a flask or dam 17 that completely surrounds the same and which cooperates therewith to form an open receptacle 18 having a bottom wall defined by the contoured surface 16 of the pattern 15 and side walls defined by the inner surfaces of the flask or dam 17 extending above and beyond the contoured surface 16. A parting agent 19, such as a solution of plasticized polyvinyl chloride, is sprayed, brushed or otherwise applied in a thin film to the contoured surface 16 of the pattern 15 and to the adjacent inner surfaces of the flask 17. As shown in FIG. 3, one or more layers of a fabric 14, e.g. ¾ ounce fiberglass mat, is positioned on the contoured surface 16. Since the surface of fabric layer 14, adjacent the contoured surface 16, ultimately forms a part of the working face 13 of the forming tool 10, this layer of fabric 14 should be carefully positioned on the contoured surface 16 and smoothed out so as to remove any wrinkles or folds therein. It is to be understood that the fabric layers 14 may be made of any of many different types of material. For example, woven materials such as fiberglass, nylon or linen cloth may be used as well as matted materials such as felt or fiberglass mat. Another material suitable for use is wire screening or wire mesh. Moreover, the layers of fabric 14 can be all of the same type of material or each of a different material. Thus, one layer may be of wire screening, another of fiberglass mat and the third of woven cloth. However, care should be taken that the fabric layer 14 positioned on the coated contoured surface 16 of the master pattern 15 is smoothed out to remove any wrinkles, folds or irregularities therein. The fabric layers 14 are extended partially up the side walls of the flask 17, as shown in FIG. 3, and are suitably secured thereto by any conventional means. This insures fabric reinforcement not only of the working surface 13 but the adjacent sides of the tool 10.

As shown in FIG. 4, the coarse particles 12, in sufficient quantity to produce the desired forming tool 10, are then dry-loaded into the receptacle 18 and on top of the fabric layer or layers 14. In order to assure an extremely smooth and strong working face 13, the layer of the fabric 14 in or next to the working surface 13 should be of wire mesh, screening or a similar material to the end that a uniform distribution of the particles 12 and of their pressure against the fabric layers 14 is achieved. The reinforcing coarse particles 12 may consist of crushed stone, gravel, pebbles, metallic shot or like materials, having diameters ranging from 1/32" to 3/8" and averaging between 3/16" to 1/4". The ultimate strength of the forming tool 10 is determined, in a large part, by the type of coarse particles used and therefore it should be selected accordingly.

The synthetic resin composition forming the body 11 of the instant forming tool 10 consists of the following materials, the proportions of each being indicated by weight:

100 parts epoxy resin
30 parts polysulphide resin
10 parts reactive diluent
10 parts amine hardener The epoxy resin should be a clear, viscous, yellow oil having a controlled viscosity from 8,000 to 12,000 cps. (Centipoise) at 77° F., a molecular weight of 350±5 and a specific gravity of 1.23±.05. The polysulphide resin should be poly phiol polysulphide polymer. It is to be understood other resins having similar characteristics to those above set forth may be substituted therefor.

The reactive diluent is preferably allyl glycidyl ether although other diluents such as butyl glycidyl ether or styrene oxide may be used. The hardener should be from the amine group, preferably diethylene triamine.

The foregoing materials from which the body 11 is made may be mixed together in any suitable apparatus and in accordance with conventional practices. When thoroughly mixed, the resulting synthetic resin composition is poured into the receptacle 18 to completely fill all of the spaces and interstices between the coarse particles 12 and to thoroughly permeate and impregnate the fabric layer or layers 14 thereby forming the body 11 of the tool 10, as shown in FIGS. 1 and 5.

The forming tool 10 is then completed and after it has cured or set within the flask 17, it is removed therefrom and is ready for use. Since the working face 13 of the tool 10, i.e. the outer surface of the initial layer of the fabric 14 impregnated with the aforesaid resin composition, has been formed directly on the contoured surface 16 of the master pattern 15, it is apparent that no finishing operations are required thereon.

Having thus described the forming tool contemplated herein and the method of its manufacture, it will be apparent that various changes in the method set forth and substitutions of materials may be made without departing from the spirt and scope of this invention.

What is claimed is:

1. The method of making a forming tool on a master pattern having a contoured surface, consisting of surrounding the contoured surface of the master pattern with a flask, applying a parting film to the contoured surface of the master pattern and the inner surfaces of the flask, positioning a layer of fabric on the contoured surface of the master pattern, dry-loading the flask with coarse particles over and in contact with the fabric, preparing a synthetic resin composition consisting of 100 parts by weight epoxy resin, 30 parts by weight polysulphide resin, 10 parts by weight reactive diluent and 10 parts by weight amine hardener, pouring the synthetic resin composition into the flask whereby the synthetic resin composition fills the spaces between the coarse particles to thereby embed the particles therein and impregnates the fabric, and removing the resulting forming tool from the flask after it has cured therein.

2. The method of making a forming tool consisting of the steps of surrounding the contoured surface of a master pattern with a flask, applying a parting film to the contoured surface of the master pattern, positioning at least one layer of fabric on the contoured surface of the master pattern, dry-loading coarse particles into the flask over and in contact with the fabric, embedding the coarse particles in and impregnating the fabric with a synthetic resin composition, and removing the resulting forming tool from the flask after it has cured therein.

3. The method of making a forming tool on a master pattern having a contoured surface to be reproduced as the working face of the tool, consisting of surrounding the contoured surface of the master pattern with a flask, applying a parting agent to the contoured surface of the master pattern and the inner surfaces of the flask, positioning at least one layer of fabric in intimate contact with the parting agent on the contoured surface of the master pattern, dry-loading gravel having an average diameter of 3/16" to 1/4" into the flask over and in contact with the fabric, preparing a synethic resin composition consisting of 100 parts by weight epoxy resin, 30 parts by weight polysulphide resin, 10 parts by weight reactive diluent and 10 parts by weight amine hardener, pouring this synthetic resin composition into the flask whereby the synthetic resin composition fills the interstices between the gravel and impregnates and permeates the fabric, and removing the resulting forming tool from the flask after it has cured therein.

4. The method of fabricating a forming tool from a master pattern having a contoured working surface consisting in surrounding the master pattern with a flask with the working surface of the pattern disposed within the flask, disposing at least one layer of fabric in intimate contact with the entire working surface of the pattern, dry-loading the flask with coarse particles of irregular size to rest in intimate contact with said fabric, pouring a synthetic resin composition comprising epoxy and polysulphide resins, a reactive diluent and an amine hardener into the flask to fill the interstices between the particles and to embed the particles in the synthetic resin and to permeate the fabric with the synthetic resin, and allowing the resin composition to cure while in the flask.

References Cited in the file of this patent

UNITED STATES PATENTS

| | | |
|---|---|---|
| 1,336,388 | Youngberg | Apr. 6, 1920 |
| 1,940,294 | Calkins | Dec. 19, 1933 |
| 2,495,640 | Muskat | Jan. 24, 1950 |
| 2,724,868 | Kish | Nov. 29, 1955 |
| 2,750,632 | Kish | June 19, 1956 |
| 2,777,790 | Kish | Jan. 15, 1957 |
| 2,836,530 | Rees | May 27, 1958 |

FOREIGN PATENTS

| | | |
|---|---|---|
| 396,405 | Great Britain | Aug. 2, 1933 |
| 553,561 | Great Britain | May 27, 1943 |

OTHER REFERENCES

"Alloying With Epoxies," Modern Plastics, September 1954, pages 155–157, 160, 161 and 240–242.

Webster's New International Dictionary, Second Edition, 1950, page 2211 (G. & C. Merriam Company, Springfield, Mass.).

Funk & Wagnalls New Standard Dictionary, 1943, page 2169 (Funk & Wagnalls Company, New York).

Encyclopaedia Britannica, 1957 Edition, vol. 19, page 934 (Encyclopaedia Britannica, Inc., Chicago).

Stewart's Scientific Dictionary, by Jeffrey R. Stewart, Fourth Edition, 1953, page 609 (Stewart Research Laboratory, Alexandria, Va.).

The Condensed Chemical Dictionary, by Arthur and Elizabeth Rose, Fifth Edition, 1956, page 960 (Reinhold Publishing Corporation, New York).

Nonmetallic Minerals, by Raymond B. Ladoo and W. M. Myers, Second Edition, 1951, pages 453 to 455 (McGraw-Hill Book Company, Inc., New York).